US010066737B2

(12) United States Patent
Baek

(10) Patent No.: US 10,066,737 B2
(45) Date of Patent: Sep. 4, 2018

(54) VEHICLE TRANSMISSION

(71) Applicant: SL Corporation, Daegu (KR)

(72) Inventor: Nam Sik Baek, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 173 days.

(21) Appl. No.: 15/173,934

(22) Filed: Jun. 6, 2016

(65) Prior Publication Data
US 2016/0363214 A1 Dec. 15, 2016

(30) Foreign Application Priority Data

Jun. 15, 2015 (KR) .................. 10-2015-0084230

(51) Int. Cl.
*F16H 59/12* (2006.01)
*F16H 63/42* (2006.01)
(Continued)

(52) U.S. Cl.
CPC .......... *F16H 59/12* (2013.01); *F16H 59/0204* (2013.01); *F16H 63/42* (2013.01); *F16H 61/662* (2013.01); *F16H 2063/423* (2013.01)

(58) Field of Classification Search
CPC ...... F16H 59/12; F16H 63/42; F16H 59/0204; F16H 2063/423; F16H 61/662
(Continued)

(56) References Cited

U.S. PATENT DOCUMENTS 5,035,158 A * 7/1991 Leigh-Monstevens ...................... F16H 59/08
180/233
5,252,798 A * 10/1993 Kamada ................. H01H 9/182
200/310

(Continued)

FOREIGN PATENT DOCUMENTS

JP 03015122 A 1/1991
JP 05019727 U 3/1993
(Continued)

OTHER PUBLICATIONS

Derwent Abstract—KR 101527054 B1: Eun Sik Kim, "Cube-Type Electronic Automatic Transmission", Abstract, Publication Date Jun. 9, 2015.*

(Continued)

*Primary Examiner* — R. A. Smith
*Assistant Examiner* — Tania Courson
(74) *Attorney, Agent, or Firm* — Mintz Levin Cohn Ferris Glovsky and Popeo, P.C.; Kongsik Kim; Jhongwoo Jay Peck

(57) ABSTRACT

A transmission for a vehicle is provided and includes a plurality of button portions that each include a button and a light emitting portion and the button is pushed to select a gear shift stage. The light emitting portion includes a light source. A gear shift condition determination unit determines gear shift conditions. Additionally, a controller is configured to determine a current gear shift stage and a selectable gear (Continued)

shift stage that corresponds to the gear shift conditions. The controller further turns on the light source included in the light emitting portion included in the button portions that corresponds to the current shift gear shift stage and the selectable gear shift stage. The light emitting portion that corresponds to the current gear shift stage and the light emitting portion that corresponds to the selectable gear shift stage are configured to emit light having different brightness levels or different colors.

18 Claims, 13 Drawing Sheets

(51) Int. Cl.
F16H 59/02 (2006.01)
F16H 61/662 (2006.01)

(58) Field of Classification Search
USPC ............... 116/28.1, 35 A; 180/90.6; 74/523, 74/473.18, 473.3
See application file for complete search history.

(56) References Cited

U.S. PATENT DOCUMENTS

| | | | | |
|---|---|---|---|---|
| 7,541,553 | B2* | 6/2009 | Meyer | F16H 59/12 200/310 |
| 7,640,823 | B2* | 1/2010 | Bowman | F16H 59/0204 74/471 XY |
| 7,643,912 | B2* | 1/2010 | Heffington | G07C 5/085 340/425.5 |
| 8,515,635 | B2* | 8/2013 | Spaulding | F16H 59/0217 180/370 |
| 8,725,368 | B2* | 5/2014 | Pudvay | F16H 59/12 701/51 |
| 9,021,911 | B2* | 5/2015 | Kim | F16H 59/105 74/473.12 |
| 9,021,912 | B2* | 5/2015 | Hermansson | F16H 61/24 74/473.3 |
| 9,022,164 | B2* | 5/2015 | Kim | F16H 59/105 180/336 |
| 9,027,429 | B2* | 5/2015 | Kim | F16H 59/105 74/473.12 |
| 9,334,948 | B2* | 5/2016 | Wang | F16H 59/08 |
| 9,410,613 | B2* | 8/2016 | Montes | B60K 35/00 |
| 9,423,021 | B2* | 8/2016 | Kim | F16H 59/105 |
| 9,435,425 | B2* | 9/2016 | Heo | F16H 59/044 |
| 9,500,275 | B2* | 11/2016 | Kim | B60K 20/02 |
| 9,593,765 | B2* | 3/2017 | Kim | F16H 59/08 |
| 9,822,871 | B2* | 11/2017 | Choi | F16H 61/12 |
| 2011/0242040 | A1* | 10/2011 | Nutaro | G06F 3/0418 345/174 |
| 2013/0228119 | A1* | 9/2013 | An | F16H 63/42 116/28.1 |
| 2014/0283639 | A1* | 9/2014 | Kim | F16H 59/08 74/473.12 |
| 2015/0107392 | A1* | 4/2015 | Wang | F16H 59/08 74/473.12 |
| 2015/0130759 | A1* | 5/2015 | Heo | B60K 35/00 345/174 |
| 2015/0144467 | A1* | 5/2015 | Nikami | H01H 15/10 200/16 R |
| 2015/0167823 | A1* | 6/2015 | Min | F16H 59/08 74/473.3 |
| 2015/0185843 | A1* | 7/2015 | Olien | B60W 50/16 345/174 |
| 2016/0077652 | A1* | 3/2016 | Yang | B60K 37/06 345/174 |
| 2016/0131247 | A1* | 5/2016 | Kim | F16H 59/08 74/473.3 |
| 2016/0378200 | A1* | 12/2016 | Lee | G06F 3/03547 345/158 |
| 2017/0147106 | A1* | 5/2017 | Kwon | B60K 37/06 |

FOREIGN PATENT DOCUMENTS

| | | |
|---|---|---|
| JP | 2002-254950 A | 9/2002 |
| KR | 200205503 Y1 | 9/2000 |
| KR | 10-2014-0018165 | 2/2014 |

OTHER PUBLICATIONS

Derwent Abstract—KR 1499222 B1: E S Kim, "Button-Type Electronic Shift Lever for Vehicle, Has Control Unit for Clearly Recognizing Operation of Button, Where Control Unit Controls N-Shift of Transmission and Changes Shft Gear Displaay of Display Section", Abstract, Publication Date Mar. 5, 2015.*

Derwent Abstract—KR 1662540 B1: E S Kim, "Position Variable Electronic Automatic Transmission Lever Comprises a Shift Button That Is Inserted in a Protusion Unit of an Upper Part Button Board, Where Lower Button Board Is Connected to the Lower Part", Abstract, Publication Date Jun. 14, 2016.*

Derwent Abstract—KR 2017000718: E S Kim, "Button-Type Electronic Transmission System, Has Printed Circuit Board (PCB) That Outputs Electric Signal Corresponding to Selected Shift Gear to Shft Controller When Touch Electrical Connection of Button Projection Is Made", Abstract, Publication Date Jan. 3, 2017.*

* cited by examiner

VEHICLE TRANSMISSION

CROSS-REFERENCE TO RELATED APPLICATIONS

This application is based on and claims priority from Korean Patent Application No. 10-2015-0084230, filed on Jun. 15, 2015, the disclosure of which is incorporated herein in its entirety by reference.

TECHNICAL FIELD

The present invention relates to a transmission for a vehicle, and more particularly to a transmission for a vehicle which selects a gear shift stage through operation of a button on which the gear shift stage is indicated.

RELATED ART

In general, a transmission may have different gear ratios to constantly maintain an engine rotation based on a vehicle speed, and a driver may change the gear ratio of the transmission by operating a gear shift lever.

A gear shift mode of the transmission may be classified into a manual gear shift mode in which a driver changes the gear shift stage and an automatic gear shift mode in which the gear shift stage is automatically changed based on the vehicle speed when the driver selects a driving stage (D). In addition, a sport mode type transmission that performs a manual gear shift and an automatic gear shift in one transmission has been used. The sport mode type transmission may perform the manual gear shift through driver's heightening or lowering (e.g., up or down movement) of a gear stage while basically performing the automatic gear shift, or may perform the automatic gear shift through an automatic transmission disposed aside a manual transmission.

Recently, the use of an electronic gear shift lever has been increased, for which a mechanical connection structure disposed between the transmission and the gear shift lever is replaced by an electrical connection structure instead of a mechanical gear shift lever. This type of electronic gear shift lever may include a lever type that selects the gear shift stage through movement of the gear shift lever, a dial type that selects the gear shift stage through rotation of a dial, and a button type that selects the gear shift stage through operation of a button on which the gear shift stage is indicated.

The button type electronic gear shift lever may include a plurality of buttons provided to select a plurality of gear shift stages, and a driver may select a gear shift stage by engaging a button that corresponds to a desired gear shift stage. However, the button type electronic gear shift lever has a high possibility of mal-operation due to user error, such as erroneous operation of a button or simultaneous operation of two or more buttons, and thus there has been a need for schemes to guide the driver to a selectable gear shift stage based on the vehicle state and to supplement the potential mal-operation during driving of the vehicle.

SUMMARY

Accordingly, the present invention provides a transmission for a vehicle, which prevents driver's mal-operation through guiding of a selectable gear shift stage based on a gear shift condition when the gear shift stage is selected through operation of a button. Additionally, the present invention provides a transmission for a vehicle, which may improve stability through gear shifting to a preset gear shift stage when a mal-operation occurs. Further advantages, subjects, and features of the invention will be set forth in part in the description which follows and in part will become apparent to those having ordinary skill in the art upon examination of the following or may be learned from practice of the invention.

In one aspect of the present invention, a transmission for a vehicle, may include a plurality of button portions that each include a button and a light emitting portion that includes a light source, wherein the button is pushed to select a gear shift stage; a gear shift condition determination unit configured to determine gear shift conditions; and a controller configured to determine a current gear shift stage and a selectable gear shift stage that corresponds to the gear shift conditions, and turn on the light source included in the light emitting portion included in the button portions that corresponds the selectable gear shift stage and the current gear shift stage, wherein the light emitting portion that corresponds to the current gear shift stage and the light emitting portion that corresponds to the selectable gear shift stage emit light having different brightness levels or colors.

According to the transmission for a vehicle according to the present invention as described above, at least the following effects may be achieved. The mal-operation may be prevented by guiding the gear shift stage that is selectable in the current gear shift stage based on the gear shift condition. Further, the vehicle stability may be improved by gear shifting to the preset gear shift stage even when the mal-operation occurs.

The effects of the present invention are not limited to the above-described effects, and further effects that have not been mentioned could be clearly understood by those skilled in the art from the following description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
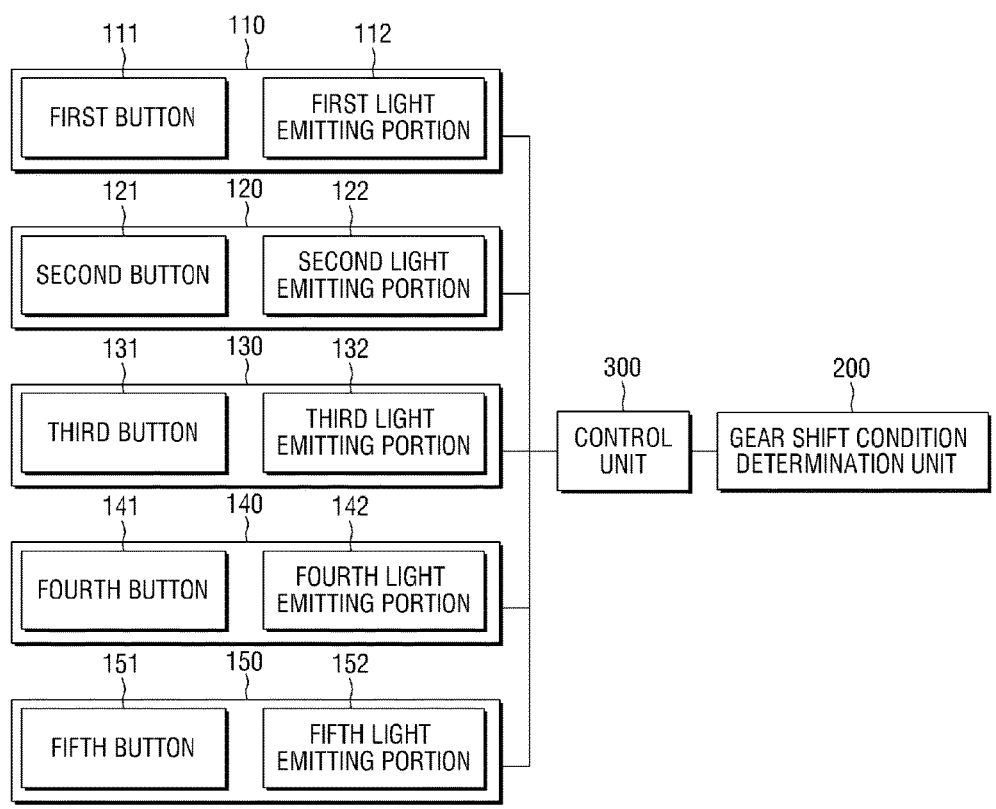
FIG. 1 is a block diagram illustrating the configuration of a transmission for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures. Accordingly, in some exemplary embodiments, well-known processes, structures, and technologies are not described in detail since they would obscure the invention in unnecessary detail.

In the following description of the present invention, the terms used are for explaining embodiments of the present invention, but do not limit the scope of the present invention. In the description, a singular expression may include a plural expression unless specially described. The term "comprises" and/or "comprising" used in the description means that one or more other components, steps, operation and/or existence or addition of elements are not excluded in addition to the described components, steps, operation and/or elements. Further, the term "and/or" includes each of mentioned items and all combinations of one or more of the items.

In the following description of the present invention, embodiments of the present invention will be described with reference to plane views and sectional views which are ideal schematic views. The form of exemplary views may be modified due to the manufacturing techniques and/or allowable errors. Accordingly, the embodiments of the present invention are not limited to their specified form as illustrated, but include changes in form being produced according to manufacturing processes. In the drawings, sizes and relative sizes of layers and areas may be exaggerated for clarity in explanation. In the entire description of the present invention, the same drawing reference numerals are used for the same elements across various figures.

Hereinafter, a transmission for a vehicle according to exemplary embodiments of the present invention will be described with reference to the accompanying drawings.

FIG. 1 is a block diagram illustrating the configuration of a transmission for a vehicle according to an exemplary embodiment of the present invention. As illustrated, a transmission 1 for a vehicle according to an exemplary embodiment of the present invention may include a plurality of button portions 110 to 150, a gear shift condition determination unit 200, and a controller 300. The controller 300 may be configured to operate the gear shift condition determination unit 200.

Figure 2:
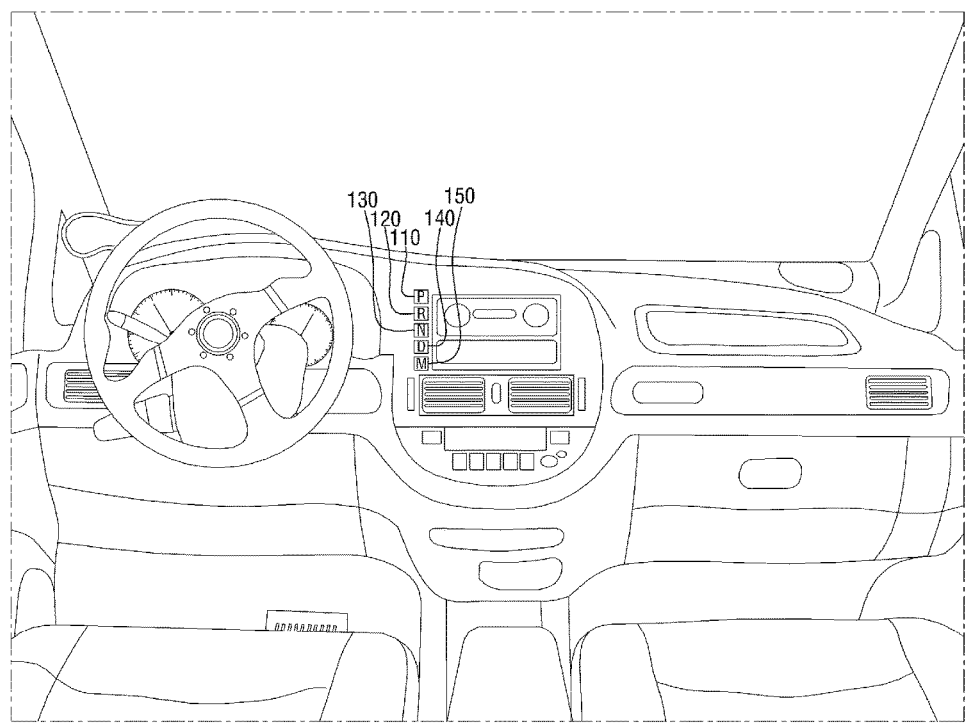
FIG. 2 is a schematic view illustrating a plurality of button portions according to an exemplary embodiment of the present invention.

In particular, the plurality of button portions 110 to 150 may be installed in locations within the vehicle accessible to a driver. In an exemplary embodiment of the present invention, the plurality of button portions 110 to 150 may be installed on one side of a center fascia as shown in FIG. 2, but are not limited thereto. Hereinafter, in an exemplary embodiment of the present invention, the plurality of button portions 110 to 150 may be referred to as a first button portion 110, a second button portion 120, a third button portion 130, a fourth button portion 140, and a fifth button portion 150, and the first to fifth button portions 110 to 150 may be used to select a parking stage (P), a reverse stage (R), a neutral stage (N), a driving stage (D), and a manual gear shift stage (M).

The parking stage P, the reverse stage R, the neutral stage N, and the driving stage D are gear shift stages selectable in an automatic gear shift mode, and the manual gear shift stage M is a gear shift stage in which a driver may manually adjust the gear stage (e.g., up or down movements of the gear stage) in a manual gear shift mode. Further, in an exemplary embodiment of the present invention, the gear shift stages may include the parking stage P, the reverse stage R, the neutral stage N, the driving stage D, and the manual gear shift stage M. However, the present invention is not limited thereto, and the type or the number of gear shift stages that may be selected using the plurality of button portions 110 to 150 may be variously changed.

Each of the first to fifth button portions 110 to 150 may include first to fifth buttons 111 to 151 and first to fifth light emitting portions 112 to 152. The driver may change the gear shift stage by selecting a desired gear shift stage through operation of any one of the first to fifth buttons 111 to 151, and the first to fifth light emitting portions 112 to 152 may be turned on to indicate the gear shift stage selected by the driver or gear shift stages that may be selected by the driver in the current gear shift stage. The details thereof will be described later.

Additionally, each of the first to fifth light emitting portions 112 to 152 may include at least one light source. When each of the first to fifth light emitting portions 112 to 152 includes a single light source, the brightness (e.g., intensity) thereof may be changed based on the level of current supplied to the single light source. Further, when each of the first to fifth light emitting portions 112 to 152 includes a plurality of light sources, the brightness level or color thereof may be changed based on the number of light sources that are turned on. However, the present invention is not limited thereto, and even when each of the first to fifth light emitting portions 112 to 152 includes a plurality of light sources, the brightness level or color thereof may be changed based on the level of current supplied to the light sources.

In an exemplary embodiment of the present invention, among the first to fifth light emitting portions 112 to 152, the light emitting portion that corresponds to the current gear shift stage and the light emitting portion that corresponds to one or more gear shift stages that may be selected in accordance with the gear shift condition in the current gear shift stage may be configured to emit light having different brightness, but are not limited thereto. The light emitting portion that corresponds to the current gear shift stage and the light emitting portion that corresponds to one or more gear shift stages that may be selected in accordance with the gear shift condition in the current gear shift stage may be configured to emit light having different colors or brightness levels.

Further, in an exemplary embodiment of the present invention, the first to fifth light emitting portions 112 to 152 may be physically integrated with the first to fifth buttons 111 to 151, but are not limited thereto. The first to fifth light emitting portions 112 to 152 may be separately configured on one side of the first to fifth buttons 111 to 151. In other words, according to the first to fifth button portions 110 to 150 as described above with reference to FIG. 2, the first to fifth buttons 111 to 151 may be physically integrated with the first to fifth light emitting portions 112 to 152, but are not limited thereto. The first to fifth light emitting portions 112 to 152 may be separately installed on one side of the first to fifth buttons 111 to 151.

Moreover, the gear shift condition determination unit 200 may be configured to determine at least one gear shift condition on which the gear shift from any one gear shift stage to another gear shift stage among the plurality of gear shift stages becomes possible. In an exemplary embodiment of the present invention, the gear shift condition determination unit 200 may be configured to determine the vehicle speed and brake operation as gear shift conditions, and may also be configured to determine the gear shift conditions through a brake signal BS generated during the brake operation (e.g., engagement of a brake pedal) and a vehicle speed signal VS generated from a sensor disposed within the vehicle based on the vehicle speed. For example, the brake signal BS may be generated when the brake pedal is operated or engaged, and the vehicle speed signal VS may be generated when the vehicle speed is equal to or less than a reference speed (e.g., about 2 km/h).

Hereinafter, in an exemplary embodiment of the present invention, when the brake signal BS is generated, it is indicated as "ON", and when the vehicle speed signal VS is generated, it is indicated as "ON". The controller 300 may be configured to determine at least one selectable gear shift stage in the current gear shift stage based on the determination result of the gear shift condition determination unit 200, and may be configured to turn on at least one of the plurality of light emitting portions 112 to 152 to allow the driver to recognize the at least one selectable gear shift stage. Accordingly, the driver may easily recognize the at least one selectable gear shift stage in the current gear shift stage based on the gear shift condition, and thus the driver's mal-operation may be prevented from occurring.

Further, to distinguish between the current gear shift stage and the at least one selectable gear shift stage, the controller 300 may be configured to operate the light emitting portion that corresponds to the current gear shift stage and the light emitting portion that corresponds to the at least one selectable gear shift stage to emit light having different brightness. For example, the controller 300 may be configured to operate the light emitting portion that corresponds to the current gear shift stage to emit light having first brightness and may be configured to operate the light emitting portion that corresponds to the at least one selectable gear shift stage to emit light having second brightness. In an exemplary embodiment of the present invention, the first brightness may be greater than the second brightness, but is not limited thereto, and vice versa.

Hereinafter, the selectable gear shift stages that may be selected from the respective gear shift stages based on the gear shift conditions will be described in detail with reference to FIGS. 3 to 7. In particular, as shown in FIGS. 3 to 7, a case where the brake signal BS is in "ON" state indicates that the brake is operated to generate the brake signal BS, and a case where the brake signal BS is in "OFF" state indicates that the brake is disengaged and thus the brake signal BS is not generated. Further, as shown in FIGS. 3 to 7, a case where the vehicle speed signal VS is in "ON" state indicates that the vehicle speed is equal to or less than the reference speed to generate the vehicle speed signal VS, and a case where the vehicle speed signal VS is in "OFF" state indicates that the vehicle speed exceeds the reference signal and thus the vehicle speed signal VS is not generated.

Figure 3:
FIGS. 3 to 7 are schematic diagrams illustrating gear shift stages selectable based on gear shift conditions in the current gear shift stage according to an exemplary embodiment of the present invention.

FIG. 3 shows an example of selectable gear shift stages in a parking stage P. When the brake signal BS and the vehicle speed signal VS are in "ON" state in the parking stage P, a reverse stage R, a neutral stage N, and a driving stage D may be selected, whereas when at least one of the brake signal BS and the vehicle speed signal VS is in "OFF" state, selection of other gear shift stages except for the parking stage P may be blocked (e.g., are not capable of being selected).

Particularly, as shown in FIG. 3, the first button portion 110 that corresponds to the parking stage P that is the current gear shift stage may be configured to emit light having the first brightness, the button portion that corresponds to the selectable gear shift portion in the current gear shift stage may be configured to emit light having the second brightness, and the button portion that corresponds to a non-selectable gear shift stage may be turned off.

Figure 4:

FIG. 4 shows an example of selectable gear shift stages in the reserve stage R. When the brake signal BS and the vehicle speed signal VS are in "ON" state in the reverse stage R, the parking stage R, the neutral stage N, and the driving stage D may be selected, whereas when at least one of the brake signal BS and the vehicle speed signal VS is in "OFF" state, the neutral stage N may be selected.

In particular, as shown in FIG. 4, the second button portion 120 that corresponds to the reverse stage R that is the current gear shift stage may be configured to emit light having the first brightness, the button portion that corresponds to the selectable gear shift portion in the current gear shift stage may be configured to emit light having the second brightness, and the button portion that corresponds to the non-selectable gear shift stage may be turned off.

Figure 5:

FIG. 5 shows an example of selectable gear shift stages in the neutral stage N. When the brake signal BS and the vehicle speed signal VS are in "ON" state in the neutral stage N, the parking stage R, the reverse stage R, and the driving stage D may be selected, whereas when at least one of the brake signal BS and the vehicle speed signal VS is in "OFF" state, the driving stage D may be selected.

In particular, as shown in FIG. 5, the third button portion 130 that corresponds to the neutral stage N that is the current gear shift stage may be configured to emit light having the first brightness, the button portion that corresponds to the selectable gear shift portion in the current gear shift stage may be configured to emit light having the second brightness, and the button portion that corresponds to the non-selectable gear shift stage may be turned off.

Figure 6:

FIG. 6 shows an example of selectable gear shift stages in the driving stage D. When the brake signal BS and the vehicle speed signal VS are in "ON" state in the driving stage D, the parking stage R, the reverse stage R, the neutral stage N, and the manual gear shift stage M may be selected, whereas when at least one of the brake signal BS and the vehicle speed signal VS is in "OFF" state, the neutral stage N and the manual gear shift stage M may be selected.

In particular, as shown in FIG. 6, the fourth button portion 140 that corresponds to the driving stage D that is the current gear shift stage may be configured to emit light having the first brightness, the button portion that corresponds to the selectable gear shift portion in the current gear shift stage may be configured to emit light having the second brightness, and the button portion that corresponds to the non-selectable gear shift stage may be turned off.

Figure 7:

FIG. 7 shows an example of selectable gear shift stages in the manual gear shift stage M. When the brake signal BS and the vehicle speed signal VS are in "ON" state in the manual gear shift stage M, the parking stage R and the driving stage D may be selected, whereas when at least one of the brake signal BS and the vehicle speed signal VS is in "OFF" state, the driving stage D may be selected.

In particular, as shown in FIG. 7, the fifth button portion 150 that corresponds to the manual gear shift stage M that is the current gear shift stage may be configured to emit light having the first brightness, the button portion that corresponds to the selectable gear shift portion in the current gear shift stage may be configured to emit light having the second brightness, and the button portion that corresponds to the non-selectable gear shift stage may be turned off.

In FIGS. 3 to 7, the selectable gear shift stages based on the gear shift conditions are merely exemplary to help understanding of the present invention, but are not limited thereto. When required, the selectable gear shift stages based on the gear shift conditions may be changed.

As described above with reference to FIGS. 3 to 7, the light emitting portion included in the button portions that correspond to the current gear shift stage and the at least one selectable gear shift stage may be configured to emit light having different brightness levels or colors, and the light emitting portion included in the button portions that correspond to the non-selectable gear shift stages may be turned off, but are not limited thereto. The light emitting portion included in the button portions that correspond to the current gear shift stage, the selectable gear shift stages, and the non-selectable gear shift stages may be configured to emit light having different brightness levels or different colors.

As described above with reference to FIGS. 3 to 7, when the gear shift is performed from the current gear shift stage to the gear shift stage selected by the driver among the selectable gear shift stages, the controller 300 may be configured to successively turn on the button portion that corresponds to the previous gear shift stage through the button portion that corresponds to the subsequent gear shift stage to inform the driver of the gear shift process.

Hereinafter, a method for turning on the plurality of light emitting portions 110 to 150 when the gear shift is performed from one gear shift stage to another gear shift stage will be described in detail with reference to FIGS. 8 to 12. Selectable gear shift stages in FIGS. 8 to 12 are the same as those as described above with reference to FIGS. 3 to 7, and the brake signal BS and the vehicle speed signal VS are in "ON" state. However, when at least one of the brake signal BS and the vehicle speed signal VS is in "OFF" state, the turn-on operation of the button portions may be performed in a similar manner.

Figure 8:
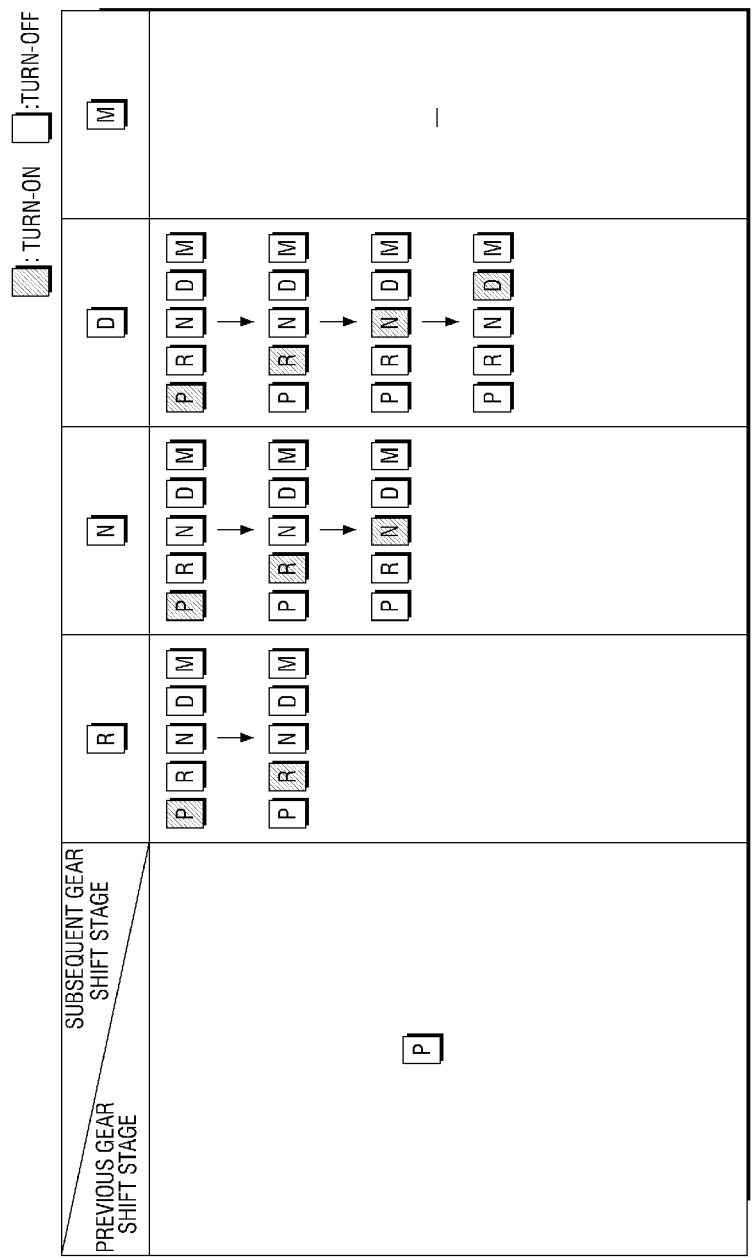
FIGS. 8 to 12 are schematic diagrams illustrating turn-on types of a plurality of button portions according to an exemplary embodiment of the present invention.

FIG. 8 exemplarily shows a case where another gear shift stage is selected in the parking stage P. When the brake signal BS and the vehicle speed signal VS, which correspond to gear shift conditions, are in "ON" state in the parking stage P, the reverse stage R, the neutral stage N, and the driving stage D may be selected, and selection of the manual gear shift stage M may be blocked. In particular, when another gear shift stage is selected in the parking stage P, the first button portion 110 that corresponds to the parking stage P through the button portion that corresponds to the selected gear shift stage may be successively turned on to inform the driver of the gear shift process.

Figure 9:
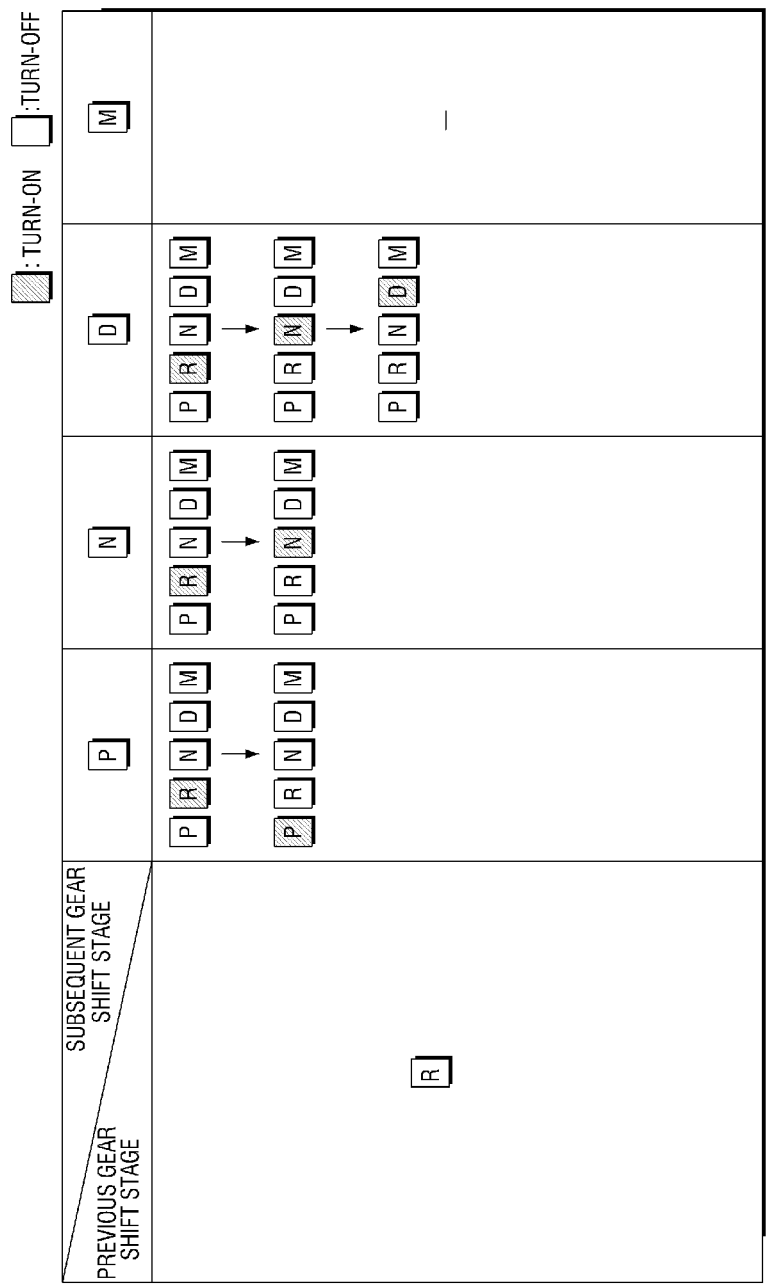

FIG. 9 exemplarily shows a case where another gear shift stage is selected in the reverse stage R. When the brake signal BS and the vehicle speed signal VS, which correspond to gear shift conditions, are in "ON" state in the reverse stage R, the parking stage P, the neutral stage N, and the driving stage D may be selected, and selection of the manual gear shift stage M may be blocked. In particular, when another gear shift stage is selected in the reverse stage R, the second button portion 120 that corresponds to the reverse stage R through the button portion that corresponds to the selected gear shift stage may be successively turned on to inform the driver of the gear shift process.

Figure 10:
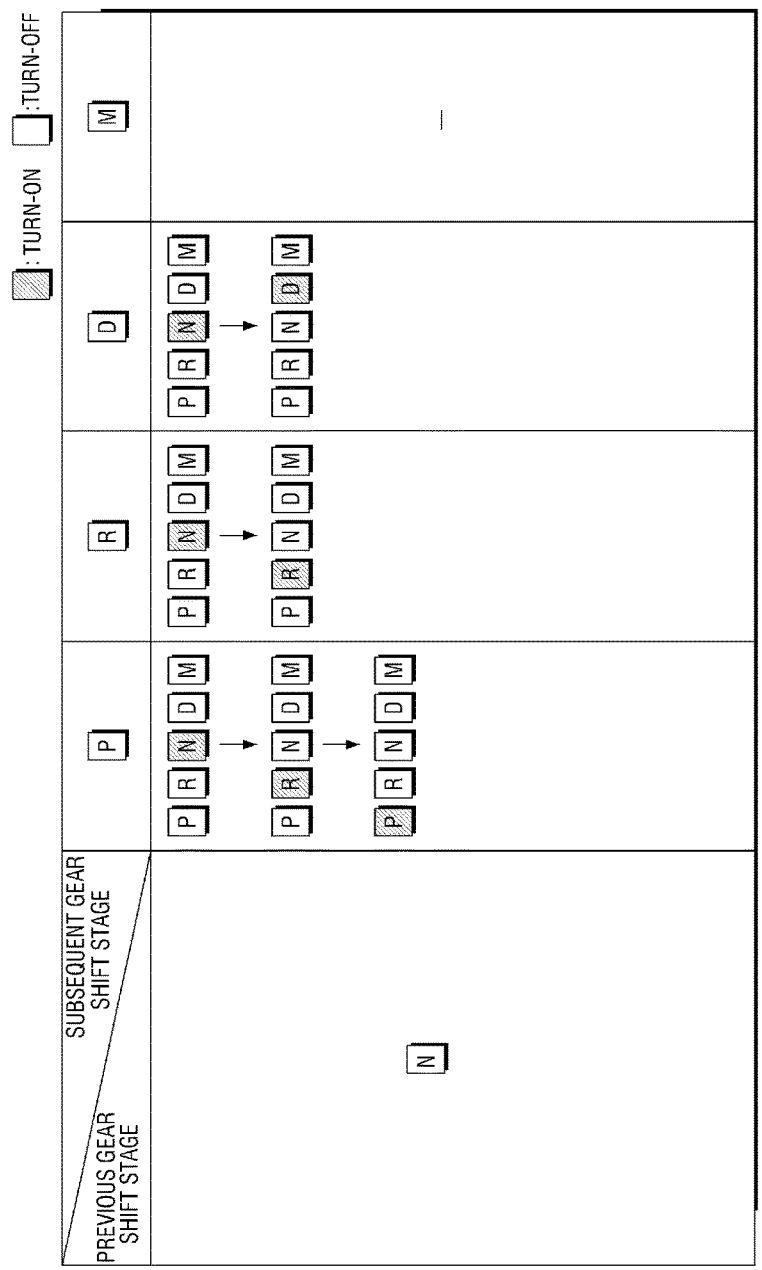

FIG. 10 exemplarily shows a case where another gear shift stage is selected in the neutral stage N. When the brake signal BS and the vehicle speed signal VS, which correspond to gear shift conditions, are in "ON" state in the neutral stage N, the parking stage P, the reverse stage R, and the driving stage D may be selected, and selection of the manual gear shift stage M may be blocked. In particular, when another gear shift stage is selected in the neutral stage N, the third button portion 130 that corresponds to the neutral stage N through the button portion that corresponds to the selected gear shift stage may be successively turned on to inform the driver of the gear shift process.

Figure 11:
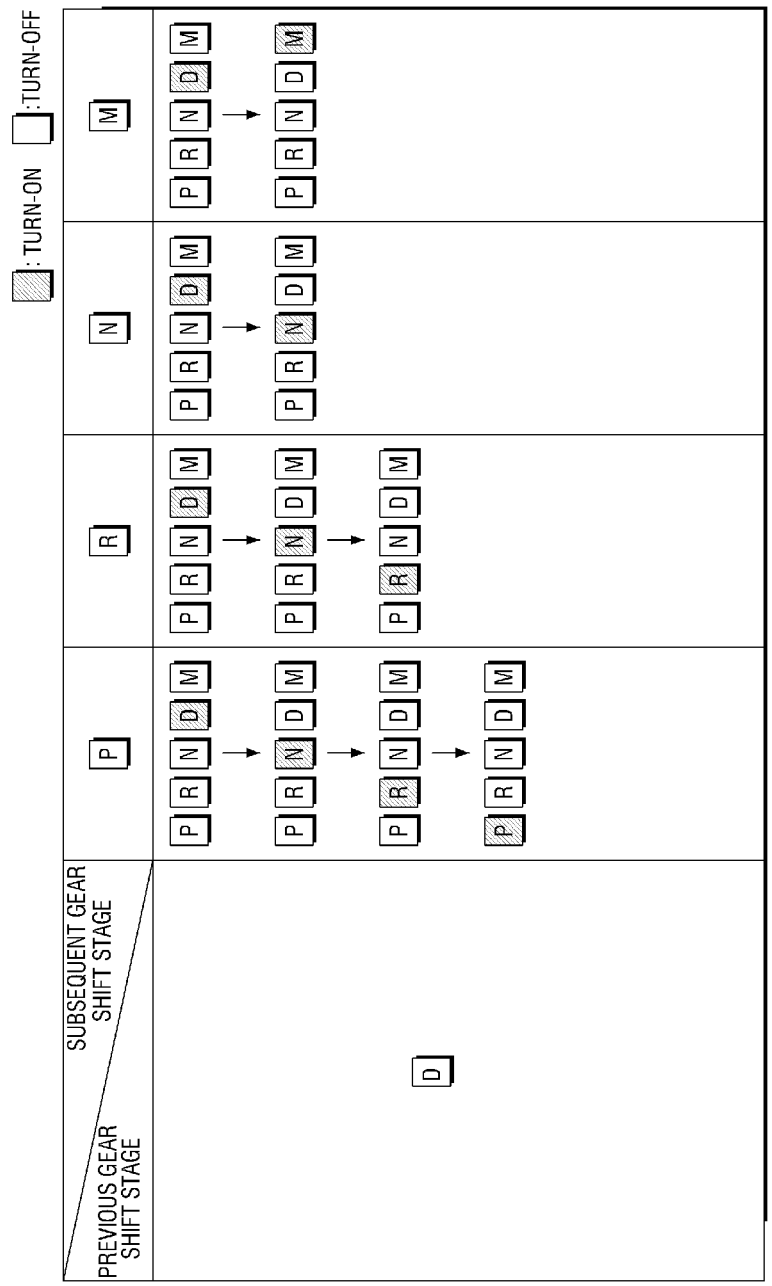

FIG. 11 exemplarily shows a case where another gear shift stage is selected in the driving stage D. When the brake signal BS and the vehicle speed signal VS, which correspond to gear shift conditions, are in "ON" state in the driving stage D, the parking stage P, the reverse stage R, the neutral stage N, and the manual gear shift stage M may be selected. In particular, when another gear shift stage is selected in the driving stage D, the fourth button portion 140 that corresponds to the driving stage D through the button portion that corresponds to the selected gear shift stage may be successively turned on to inform the driver of the gear shift process.

Figure 12:
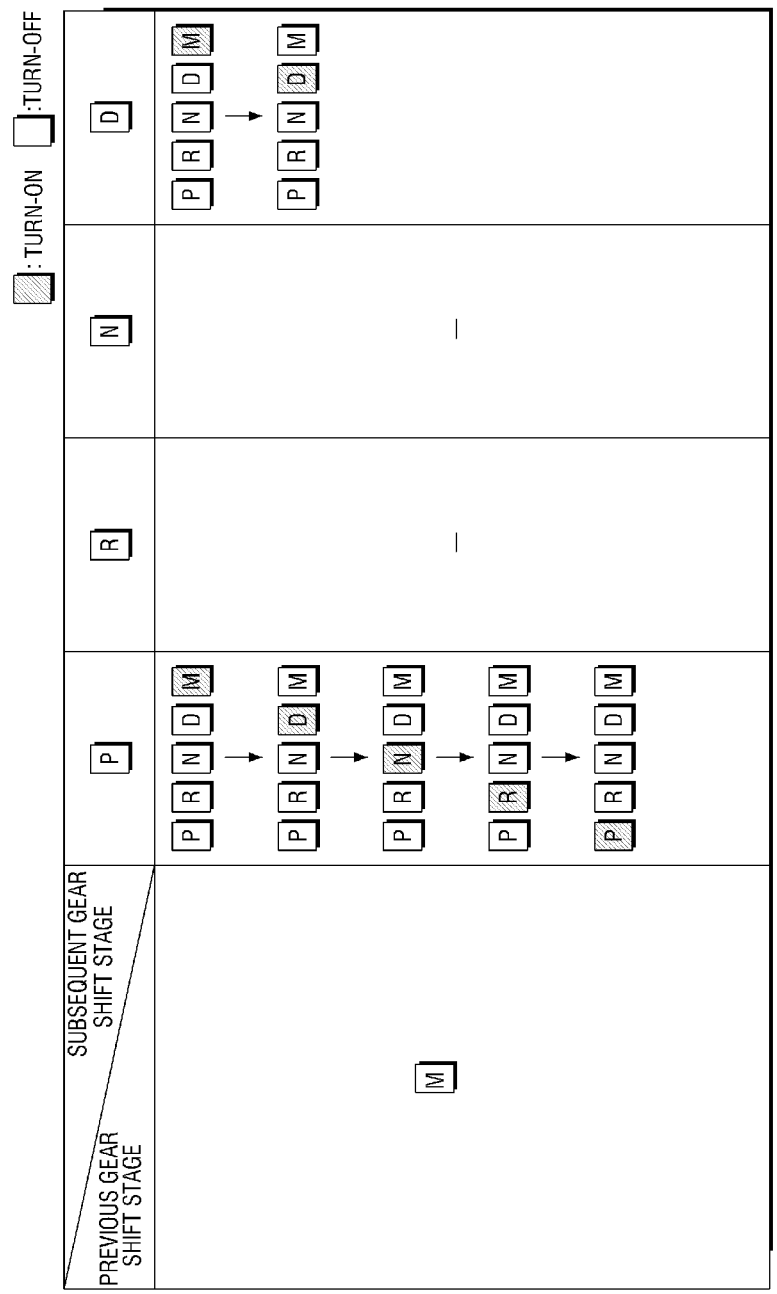

FIG. 12 exemplarily shows a case where another gear shift stage is selected in the manual gear shift stage M. When the brake signal BS and the vehicle speed signal VS, which correspond to gear shift conditions, are in "ON" state in the manual gear shift stage M, the parking stage P and the driving stage D may be selected, and selection of the reverse stage R and the neutral stage N may be blocked. In particular, when another gear shift stage is selected in the manual gear shift stage M, the fifth button portion 150 that corresponds to the manual gear shift stage M through the button portion that corresponds to the selected gear shift stage may be successively turned on to inform the driver of the gear shift process.

As described above with reference to FIGS. 8 to 12, the brightness of the light emitting portion included in the button portions while the light sources of the button portions are successively turned on may be a first brightness, a second brightness, or another brightness.

As described above with reference to FIGS. 8 to 12, the controller 300 may be configured to successively turn on the button portion that corresponds to the current gear shift stage through the button portion that corresponds to the gear shift stage selected by the driver when the vehicle is driven normally, but is not limited thereto. The controller 300 may further be configured to non-successively turn on the light sources the button portions to perform the gear shift from the current gear shift stage to a preset gear shift stage under a specific situation.

Particularly, it may be understood that the non-successive turn-on of the sources of the button portions indicates that the light source of the button portion that corresponds to the preset gear shift stage may be directly turned on without any intermediate process when the gear shift is performed to the preset gear shift stage when the light source of the button portion that corresponds to the current gear shift stage is in "ON" state.

Hereinafter, a case where the controller 300 executes the gear shift from the current gear shift stage to the preset gear shift stage under the specific situation will be described in detail.

When two or more of the plurality of button portions 110 to 150 are simultaneously operated, the controller 300 may be configured to execute the gear shift to the preset gear shift stage. For example, when two or more button portions are operated simultaneously, the controller 300 may be configured to execute the gear shift to the parking stage P. In other words, when two or more button portions including the button portion that corresponds to the parking stage P are operated simultaneously in the current gear shift stage, the controller 300 may be configured to execute the gear shift to the parking stage P. In particular, the button portions may not be successively turned on from the current gear shift stage to the parking stage P, but the first button portion 110 corresponding to the parking stage P may be directly turned on.

Further, when two or more button portions except for the button portion that corresponds to the parking stage P are operated simultaneously, the controller 300 may be configured to maintain the current gear shift stage. In particular, when one or more button portions among the plurality of button portions 110 to 150 are operated for a predetermined time or more, the controller 300 may be configured to output a notification through a lamp blinking or sound operation. On the other hand, the controller 300 may be configured to execute the gear shift from the current gear shift stage to the preset gear shift stage based on the vehicle state.

Figure 13:
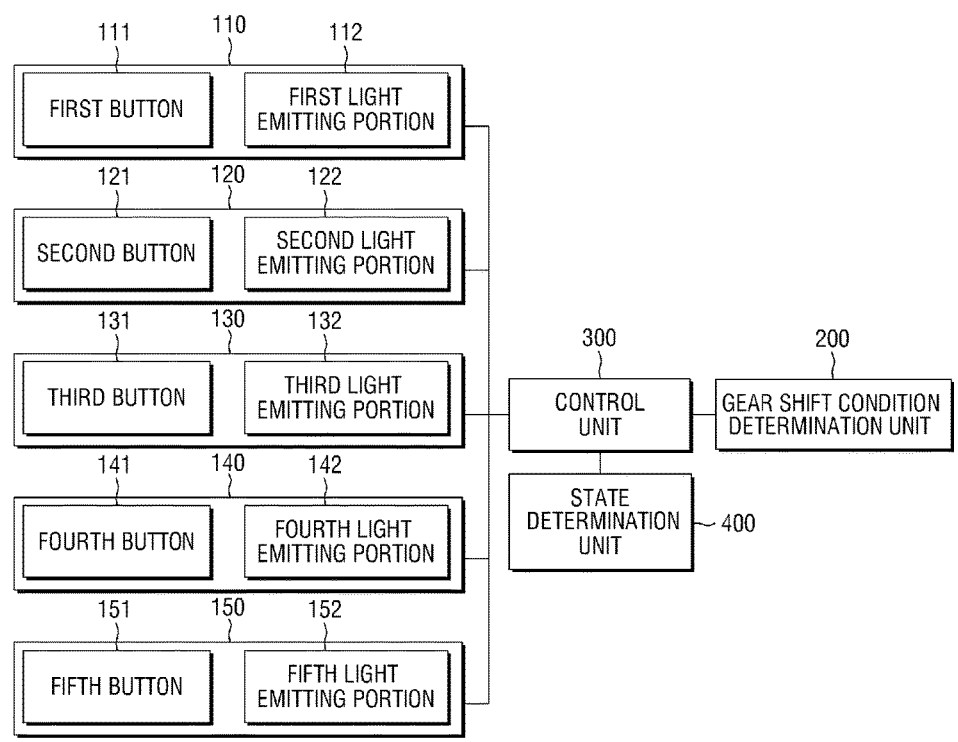
FIG. 13 is a block diagram illustrating the configuration of a transmission for a vehicle according to another exemplary embodiment of the present invention.

FIG. 13 is a block diagram illustrating the configuration of a transmission for a vehicle according to another exemplary embodiment of the present invention. As illustrated, in a similar manner to the above-described exemplary embodiment, a transmission 1 for a vehicle according to another exemplary embodiment of the present invention may further include a state determination unit 400 in addition to the plurality of button portions 110 to 150, the gear shift condition determination unit 200, and the controller 300.

In another exemplary embodiment of the present invention, the state determination unit 400 may be configured to determine various vehicle states, such as engine-off of the vehicle in a specific gear shift stage and input of a parking release actuator operation request in the specific gear shift stage, but is not limited thereto.

Hereinafter, when the controller 300 executes the gear shift to a preset gear shift stage based on the determination result of the state determination unit 400 will be described in detail.

When the button portion that corresponds to the non-parking stage (e.g., the reverse stage R, neutral stage N, driving stage D, or manual gear shift stage M) is operated after the engine-off in the neutral stage N, the controller 300 may be configured to maintain the neutral stage N, whereas when the engine is turned off during the vehicle driving, for example, in the reverse stage R, the driving stage D, or the manual gear shift stage M, the controller 300 may be configured to execute the gear shift to the parking stage P based on the vehicle speed after the gear shift to the neutral stage N.

For example, when the engine is turned off in the manual gear shift stage M, the controller 300 be configured to execute the gear shift to the neutral stage N, and then when the vehicle speed is reduced to the reference speed, the controller 300 may be configured to execute the gear shift to the parking stage P. In particular, unlike the arrangement order of the plurality of button portions 110 to 150, the third button portion 130 and the first button portion 110, which correspond to the neutral stage N and the parking stage P, may be non-successively turned on at once.

Further, when the parking release actuator operation request is input after the engine-off in the gear shift stage except for the neutral stage N, the controller 300 may be configured to execute the gear shift to the neutral stage N, and then when the first button portion 110 that corresponds to the parking stage P is operated after the engine-off in the neutral stage N, the controller 300 may be configured to execute the gear shift be performed to the parking stage P. Even when the gear is shifted to the preset gear shift stage, the button portion that corresponds to the corresponding gear shift stage may be non-successively turned on at once. The non-successive turn-on of the plurality of button portions 110 to 150 is not limited to the above-described examples, and when required, various methods therefor may be used.

As described above, in another exemplary embodiment of the present invention, the gear shift may be executed to the preset gear shift stage even during the driver's mal-operation, and thus the vehicle stability may be improved.

In another exemplary embodiment of the present invention, the controller 300 may be configured to turn on the light source of the button portions non-successively during gear shifting to the preset gear shift stage based on the vehicle state. However, the present invention is not limited thereto, and even in the case where the gear shift is performed to the preset gear shift stage based on the vehicle state, the light source of the button portions may be non-successively turned on.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A transmission for a vehicle, comprising:
 a plurality of button portions that each include a button and a light emitting portion, and the light emitting portion includes a light source, wherein the button is pushed to select a gear shift stage;
 a gear shift condition determination unit configured to determine gear shift conditions;
 a controller configured to determine a current gear shift stage and a selectable gear shift stage that corresponds to the gear shift conditions, and turn on the light source included in the light emitting portion included in the button portions that corresponds to the current shift gear shift stage and the selectable gear shift stage,
 wherein the light emitting portion that corresponds to the current gear shift stage and the light emitting portion that corresponds to the selectable gear shift stage are configured to emit light having different brightness levels or different colors, and wherein when two or more of the plurality of buttons of button portions are pushed simultaneously, the controller is configured to shift the gear shift stage to a preset gear shift stage and turn on the light source included in the light emitting portion included in the button portion that corresponds to the preset gear shift stage.

2. The transmission of claim 1, wherein the gear shift conditions include at least one selected from whether a brake is operated and a vehicle speed.

3. The transmission of claim 1, wherein the controller is configured to successively turn on the light source included in the light emitting portion included in the button portion that corresponds to the current gear shift stage among the plurality of button portions through the button portion that corresponds to the selected gear shift stage among the at least one selectable gear shift stage.

4. The transmission of claim 1, wherein when two or more of the plurality of buttons of button portions including a parking stage are pushed simultaneously, the controller is configured to shift the gear shift stage to the parking stage and turn on the light source included in the light emitting portion included in the button portion that corresponds to the parking stage.

5. The transmission of claim 1, wherein when two or more of the plurality of buttons of button portions except for a parking stage are pushed simultaneously, the controller is configured to maintain the gear shift stage in the gear stage before pushing the button and turn on the light source included in the light emitting portion included in the button portion that corresponds to the gear stage before pushing the button.

6. The transmission of claim 1, wherein when the button of a non-parking stage is pushed after an engine is turned off and the vehicle is being stopped in a neutral stage (N), the controller is configured to maintain the gear shift stage in the neutral stage (N).

7. The transmission of claim 1, wherein when the button of a non-parking stage is pushed after an engine is turned off while the vehicle is being driven, the controller is configured to shift the gear shift stage to a neutral stage (N), and when a vehicle speed is reduced to less than a reference speed, the controller is configured to shift the gear shift stage to a parking stage (P).

8. The transmission of claim 1, wherein when the button of a parking stage is pushed after an engine is turned off and the vehicle speed is less than a reference speed in a neutral stage (N), the controller is configured to shift the gear shift stage to a parking stage (P).

9. The transmission of claim 1, wherein when one or more of the plurality of buttons are operated continuously over a predetermined period of time, the controller is configured to output a notification to a driver.

10. A transmission for a vehicle, comprising:
a plurality of button portions that each include a button and a light emitting portion, and the light emitting portion includes a light source, wherein the button is pushed to select a gear shift stage;
a gear shift condition determination unit configured to determine gear shift conditions;
a controller configured to detect a current gear shift stage, determine which gear shift stage is selectable and which gear shift stage is non-selectable by using a preset rule based on the current gear shift stage and the gear shift conditions, and turn on the light source included in the light emitting portion included in the button portions that corresponds to the gear shift stage that is selectable.

11. The transmission of claim 10, wherein the light source included in the light emitting portion included in the button portions that corresponds to the current shift gear shift stage is turned on to emit light having a different brightness level or different color than the light emitted from the light source that corresponds to the gear shift stage that is selectable.

12. The transmission of claim 11, wherein when two or more of the plurality of buttons of button portions including a parking stage are pushed simultaneously, the controller is configured to shift the gear shift stage to the parking stage and turn on the light source included in the light emitting portion included in the button portion that corresponds to the parking stage.

13. The transmission of claim 11, wherein when two or more of the plurality of buttons of button portions except for a parking stage are pushed simultaneously, the controller is configured to maintain the gear shift stage in a previous gear stage before pushing the buttons and turn on the light source included in the light emitting portion included in the button portion that corresponds to the previous gear stage before pushing the buttons.

14. The transmission of claim 11, wherein when the button of a non-parking stage is pushed after an engine is turned off and the vehicle is being stopped in a neutral stage (N), the controller is configured to maintain the gear shift stage in the neutral stage (N).

15. The transmission of claim 11, wherein when the button of a non-parking stage is pushed after an engine is turned off while the vehicle is being driven, the controller is configured to shift the gear shift stage to a neutral stage (N), and when a vehicle speed is reduced to less than a reference speed, the controller is configured to shift the gear shift stage to a parking stage (P).

16. The transmission of claim 11, wherein when the button of a parking stage is pushed after an engine is turned off and the vehicle speed is less than a reference speed in a neutral stage (N), the controller is configured to shift the gear shift stage to a parking stage (P).

17. The transmission of claim 10, wherein the gear shift conditions include at least one selected from whether a brake is operated and a vehicle speed.

18. The transmission of claim 10, wherein when one or more of the plurality of buttons are operated continuously over a predetermined period of time, the controller is configured to output a notification to a driver.

* * * * *